US012569941B2

(12) United States Patent
Yoshikawa et al.

(10) Patent No.: US 12,569,941 B2
(45) Date of Patent: Mar. 10, 2026

(54) SOLDER ALLOY, SOLDER PASTE, SOLDER BALL, SOLDER PREFORM, SOLDER JOINT, IN-VEHICLE ELECTRONIC CIRCUIT, ECU ELECTRONIC CIRCUIT, IN-VEHICLE ELECTRONIC CIRCUIT DEVICE AND ECU ELECTRONIC CIRCUIT DEVICE

(71) Applicant: Senju Metal Industry Co., Ltd., Tokyo (JP)

(72) Inventors: Shunsaku Yoshikawa, Tokyo (JP); Takashi Saito, Tokyo (JP); Yuuki Iijima, Tokyo (JP); Kanta Dei, Tokyo (JP); Takahiro Matsufuji, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 18/746,193

(22) Filed: Jun. 18, 2024

(65) Prior Publication Data

US 2024/0342838 A1     Oct. 17, 2024

Related U.S. Application Data

(62) Division of application No. 17/770,142, filed as application No. PCT/JP2021/023598 on Jun. 22, 2021, now Pat. No. 12,053,843.

(30) Foreign Application Priority Data

Jun. 23, 2020     (JP) ............................. JP2020-107816

(51) Int. Cl.
*B23K 35/26*          (2006.01)
*B23K 35/02*          (2006.01)
(Continued)

(52) U.S. Cl.
CPC .......... *B23K 35/262* (2013.01); *B23K 35/025* (2013.01); *C22C 13/02* (2013.01); *B23K 2101/36* (2018.08)

(58) Field of Classification Search
None
See application file for complete search history.

(56) References Cited

U.S. PATENT DOCUMENTS 6,253,988 B1     7/2001  Pereira
2002/0127136 A1  9/2002  Takaoka et al.
(Continued)

FOREIGN PATENT DOCUMENTS

CN     101801588 A     8/2010
CN     101801589 A     8/2010
(Continued)

OTHER PUBLICATIONS

Decision to Grant a Patent for related Application No. JP 2020-107816 dated Apr. 8, 2021 and an English-language translation thereof.

(Continued)

*Primary Examiner* — Devang R Patel
(74) *Attorney, Agent, or Firm* — The Webb Law Firm

(57)     ABSTRACT

A solder alloy consisting of Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, As: 0.002 to 0.250% by mass, and a balance Sn.

10 Claims, 6 Drawing Sheets

(51) Int. Cl.
  *C22C 13/02*      (2006.01)
  *B23K 101/36*     (2006.01)

(56)             References Cited

U.S. PATENT DOCUMENTS

| | | | |
|---|---|---|---|
| 2010/0294565 A1 | 11/2010 | Kawamata et al. | |
| 2010/0307823 A1 | 12/2010 | Kawamata et al. | |
| 2016/0056570 A1 | 2/2016 | Yoshikawa et al. | |
| 2016/0279741 A1 | 9/2016 | Ukyo et al. | |
| 2018/0029169 A1 | 2/2018 | Arai et al. | |
| 2018/0102464 A1 | 4/2018 | de Avila Ribas et al. | |
| 2019/0389012 A1* | 12/2019 | Ribas | B23K 1/00 |
| 2020/0306895 A1 | 10/2020 | Iijima et al. | |
| 2021/0308808 A1 | 10/2021 | Kawasaki et al. | |

FOREIGN PATENT DOCUMENTS

| | | |
|---|---|---|
| CN | 105142856 A | 12/2015 |
| CN | 107427969 A | 12/2017 |
| CN | 108581266 A | 9/2018 |
| CN | 109014652 A | 12/2018 |
| CN | 109154036 A | 1/2019 |
| CN | 111093889 A | 5/2020 |
| JP | 200218589 A | 1/2002 |
| JP | 201577601 A | 4/2015 |
| JP | 2016107343 A | 6/2016 |
| JP | 2016179498 A | 10/2016 |
| JP | 6521161 B1 | 5/2019 |
| JP | 201972770 A | 5/2019 |
| JP | 2019147173 A | 9/2019 |
| JP | 6624322 B1 | 12/2019 |
| JP | 2020104169 A | 7/2020 |
| JP | 2020157349 A | 10/2020 |
| TW | 1650426 B | 2/2019 |
| WO | 2006059115 A1 | 6/2006 |
| WO | 2009011341 A1 | 1/2009 |
| WO | 2014163167 A1 | 10/2014 |

OTHER PUBLICATIONS

International Search Report for related Application No. PCT/JP2021/023598 dated Sep. 14, 2021.

Notice of Reasons for Refusal for related Application No. JP 2020-107816 dated Jan. 12, 2021 and an English-language translation thereof.

Office Action for related Application No. KR 1020227015629 dated Nov. 21, 2022.

Written Opinion for related Application No. PCT/JP2021/023598 dated Sep. 14, 2021 and an English-language translation thereof.

* cited by examiner

Example 1

Comparative Example 12

Comparative Example 14

Example 1

SOLDER ALLOY, SOLDER PASTE, SOLDER BALL, SOLDER PREFORM, SOLDER JOINT, IN-VEHICLE ELECTRONIC CIRCUIT, ECU ELECTRONIC CIRCUIT, IN-VEHICLE ELECTRONIC CIRCUIT DEVICE AND ECU ELECTRONIC CIRCUIT DEVICE

CROSS-REFERENCE TO RELATED APPLICATIONS

This application is a divisional of U.S. patent application Ser. No. 17/770,142 filed Jun. 22, 2021, which is the United States national phase of International Patent Application No. PCT/JP2021/023598 filed Jun. 22, 2021, and claims priority to Japanese Patent Application No. 2020-107816 filed Jun. 23, 2020, the disclosures of which are hereby incorporated by reference in their entireties.

TECHNICAL FIELD

The present invention relates to a solder alloy, a solder paste, a solder ball, a solder preform, a solder joint, an in-vehicle electronic circuit, an ECU electronic circuit, an in-vehicle electronic circuit device, and an ECU electronic circuit device.

BACKGROUND ART

Automobiles are equipped with electronic circuits (hereinafter referred to as an in-vehicle electronic circuits) that have electronic components soldered to printed boards. In-vehicle electronic circuits are used for devices that electrically control engines, power steering, brakes, and the like, and are extremely important safety components for running automobiles. In particular, an in-vehicle electronic circuit referred to as an ECU (Engine Control Unit), which is an electronic circuit that controls a vehicle with a computer for improvement in fuel efficiency, should be capable of stably operating without failures over a long period of time. Many of these ECUs are generally installed near engines, and the usage environments have sever conditions.

The vicinity of an engine where such an in-vehicle electronic circuit is installed reaches extremely high temperatures during the rotation of the engine. On the other hand, when the rotation of the engine is stopped, the vicinity will be exposed to the outside air temperature, for example, an environment below freezing in winter in cold regions such as North America and Siberia.

Accordingly, in-vehicle electronic circuits are expected to repeatedly run and stop the engines, and thus should cope with severe temperature changes.

When an in-vehicle electronic circuit is placed in such an environment that significantly changes in temperature for a long period of time, the electronic component and the printed board each cause thermal expansion and contraction. Because of the large difference between the linear thermal expansion coefficient of the electronic component and the linear thermal expansion coefficient of the printed board, however, a soldered part that joins the electronic component and the printed board (hereinafter, referred to as a "solder joint") undergoes a certain thermal displacement during use in the above-mentioned environment, and stress is thus repeatedly applied due to the temperature changes. Then, the stress is applied to the solder joint, and finally the joined interface of the solder joint part is broken. In electronic circuits, even if the solder joints are not completely broken, cracks are generated in the solder joint parts at a crack rate of 99% or less, possibly increasing the resistance values of the circuits and then resulting in malfunctions, even if the solder joints are electrically conductive. The fact that the crack generation in the solder joints causes the in-vehicle electronic circuits, in particular, ECUs, to malfunction can lead to serious car accidents involving human lives. As described above, the heat cycle characteristics are particularly important for in-vehicle electronic circuits, in particular, ECUs, for which the severest conceivable temperature conditions are required.

As a solder alloy that can withstand such severe temperature conditions, Patent Literature 1 discloses a lead-free solder alloy and the like composed of Ag: 1 to 4% by mass, Cu: 0.6 to 0.8% by mass, Sb: 1 to 5% by mass, Ni: 0.01 to 0.2% by mass, the balance of Sn.

CITATION LIST

Patent Literature

Patent Literature 1: WO2014/163167

SUMMARY OF INVENTION

Problem to be Solved by Invention

On the other hand, in the solder joint part, a phenomenon referred to as "spalling" has been observed in which the alloy layer is spalled from the interface by aging treatment. This phenomenon referred to as "spalling" means that when a proportionate heat treatment (temperature and time) is applied to the joint part, an originally formed IMC layer (Intermetallic Compound layer) is spalled into the solder bulk. When the solder alloy contains Ni therein as in Patent Document 1, "spalling" is more likely to be caused. The electric current is a flow of electrons, and thus, the increased amount of "spalling" of such an intermetallic compound locally blocks the transfer of electrons, thereby adversely affecting the acoustic quality (generating noises). Further, the inventors have confirmed that in the case where the alloy contains Ni, the particle size of the alloy is made finer. It is presumed that the particle size of the intermetallic compound is made finer as described, thereby more easily causing "spalling".

The present invention provides a solder alloy and the like that can prevent adverse effects on the acoustic quality, by suppression or the like of spalling of compounds into the alloy in the case of remelting a joint or applying a high-temperature load, while achieving higher heat cycle characteristics than before.

Solution to Solve Problem

A solder alloy according to the present invention may comprise Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, and a balance Sn.

The solder alloy according to the present invention may further comprise 0.002 to 0.250% by mass of As.

In the solder alloy according to the present invention, a sum of a value of the % by mass of Fe and a value of three times the % by mass of Co is 0.03 to 0.10.

The solder alloy according to the present invention may further comprise 0.004 to 0.250% by mass of Zr.

According to the present invention, a solder paste having a solder powder being the solder alloy according to any one of the above solder alloys and a flux is provided.

According to the present invention, a solder ball and a solder preform being the solder alloy according to any one of the above solder alloys are provided.

According to the present invention, a solder joint, an in-vehicle electronic circuit and an ECU electronic circuit having any one of the above solder alloys are provided.

According to the present invention, an in-vehicle electronic circuit device including the above in-vehicle electronic circuit is provided.

According to the present invention, an ECU electronic circuit device including the ECU electronic circuit is provided.

By adopting a solder alloy comprising Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, As: 0.002 to 0.250% and a balance Sn like the present invention, it is possible to provide a solder alloy and the like that can prevent adverse effects on the acoustic quality, by suppression or the like of spalling of compounds into the alloy in the case of remelting a joint or applying a high-temperature load, while achieving higher heat cycle characteristics, and that can suppress the generation of voids and improve the acoustic quality.

EMBODIMENT FOR CARRYING OUT INVENTION

1. Solder Alloy

Figure 1:
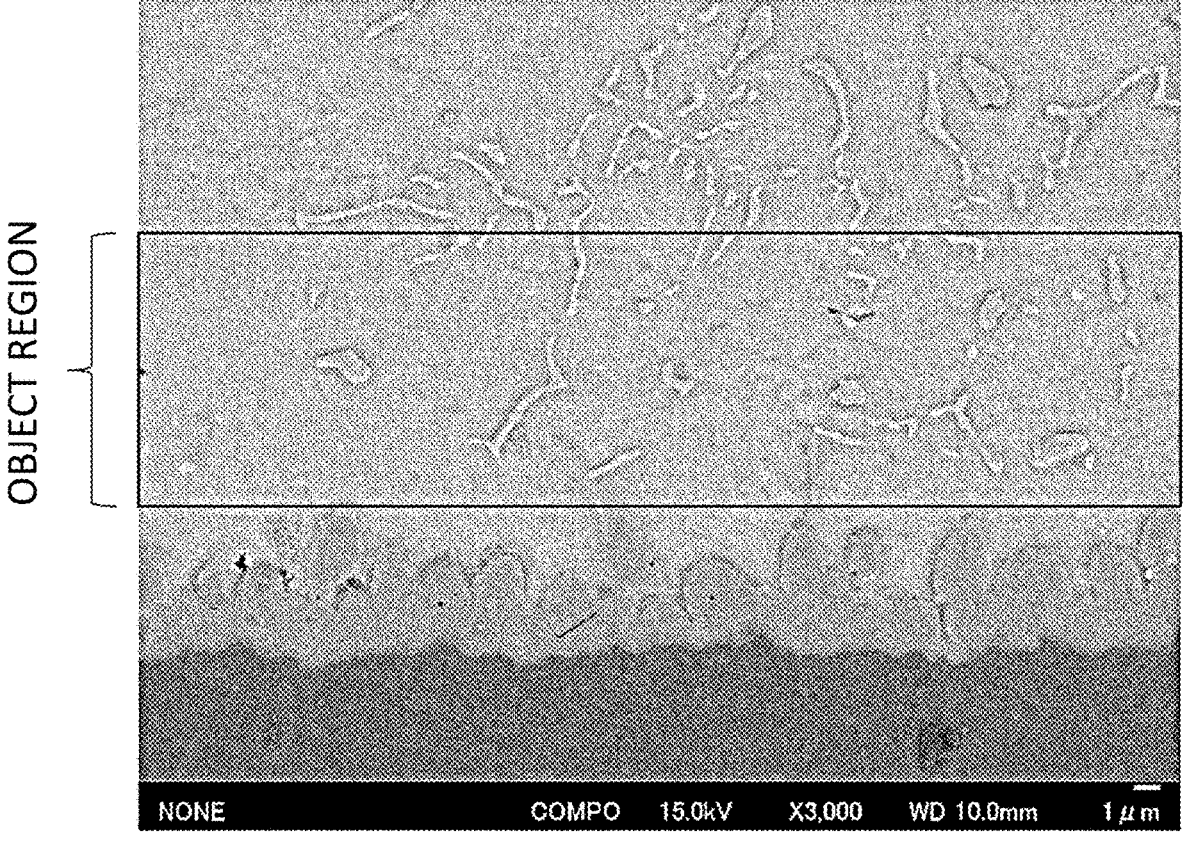
FIG. 1 is an image that shows the result of a cross-section observation in Example 1.

The solder alloy according to the present embodiment is typically a lead-free solder alloy. Hereinafter, the elements included in the solder alloy according to the present embodiment will be described.

(1) Ag: 3.1 to 4.0% by Mass

Ag has the effect of improving the wettability of the solder alloy, and can cause the precipitation of a network of $Ag_3Sn$ intermetallic compounds in the solder matrix to make improvement in heat cycle characteristics. It is to be noted that the "heat cycle characteristic" in the present embodiment mean characteristic in a TCT (Thermal Cycling Test).

If the Ag content exceeds 4% by mass, the problem of increasing the liquidus-line temperature of the solder alloy can be caused. When the liquidus-line temperature is increased as described above, the problem of hindering the effect of producing finer SnSb can be caused without producing a re-solid solution of Sb. On the other hand, if the Ag content is 3% by mass or less, the problem of causing the network to block the transfer of molecules (conduction of sounds) can be caused without the dispersion phenomenon of the $Ag_3Sn$ compounds in the alloy. The Ag content from 3.1 to 4.0% by mass, which is slightly hypereutectic, is an amount such that $Ag_3Sn$ is produced but no network is formed. The lower limit of the Ag content is preferably 3.3% by mass. The upper limit of Ag content is preferably 3.5% by mass.

(2) Cu: 0.6 to 0.8% by Mass

Cu can prevent Cu lands from Cu corrosion and lower the melting point of the solder alloy.

If the Cu content exceeds 0.8% by mass, the problem of increasing the liquidus-line temperature of the solder alloy can be caused. On the other hand, if the Cu content is less than 0.6% by mass, the formation of the alloy layer proceeds (the diffusion of Cu and Ni in the electrode is suppressed by the inclusion of Cu in the solder), and the problem of deteriorating the structure can be thus caused. The lower limit of the Cu content is preferably 0.65% by mass. The upper limit of the Cu content is preferably 0.75% by mass.

(3) Bi: 1.5 to 5.5% by Mass and Sb: 1.0 to 6.0% by Mass

In a heat cycling test, Sb is present as a solid solution in Sn at 150° C., and with decrease in temperature, the Sb in the Sn matrix gradually becomes supersaturated as a solid solution, and at −55° C., forms a structure that precipitates as an SnSb intermetallic compound. Thus, the solder alloy can exhibit excellent heat cycle characteristics.

If Sb is less than 1.0% by mass, the problem of producing an insufficient effect can be caused in the heat cycle characteristics. On the other hand, if Sb exceeds 6.0% by mass, the amount of the compound will be increased, a coarser compound will be produced, and the problem of deteriorating the structure can be caused.

Bi can further improve the heat cycle characteristics. Sb not only causes the intermetallic compound of SnSb to precipitate to form a precipitation-dispersion-strengthened alloy, but also has the effect of entering the Sn crystal lattice and replacing Sn to strain the Sn crystal lattice, thereby improving the heat cycle characteristics. In this case, when the solder alloy contains Bi, the Bi, which is larger in atomic weight and greater in effect of straining the crystal lattice than Sb, is replaced with Sb, thus allowing the heat cycle characteristics to be further improved. In addition, Bi will not interfere with the formation of fine SnSb compounds, thereby maintaining the precipitation-dispersion strengthened solder alloy.

If the Bi content exceeds 5.5% by mass, the ductility of the solder alloy itself will be decreased, thereby making the alloy hard and brittle, and the problem of deteriorating the heat cycle characteristics can be thus caused. On the other hand, if the Bi content is less than 1.5% by mass, Sb is less likely to be substituted, the heat cycle improvement effect is less likely to be produced, the amount of fine SnSb intermetallic compounds is decreased, and the problem of failing to achieve the heat cycle improvement effect can be thus caused. The lower limit of the Bi content is preferably 2.0% by mass, more preferably 2.8% by mass. The upper limit of the Bi content is preferably 5.2% by mass.

The lower limit of the Sb content is preferably 2.0% by mass, more preferably 2.88. The upper limit of the Sb content is preferably 5.2% by mass. It is to be noted that the case of the Sb content in excess of 4.0% by mass is even more preferred in that high heat cycle resistance can be achieved.

(4) Co: 0.001 to 0.030% by Mass

Containing Co makes Sn crystal grains finer, and improves the heat cycle characteristics. If Co is included to be more than 0.030% by mass, however, the amount of the compound will be excessively increased, a coarser compound will be produced, and the problem of deteriorating the structure can be caused. On the other hand, if Co is included to be only less than 0.001% by mass, the problem of producing an insufficient improvement effect can be caused for the heat cycle characteristics. The lower limit of the Co content is preferably 0.004% by mass, more preferably 0.006% by mass. The upper limit of the Co content is preferably 0.020% by mass, more preferably 0.010% by mass.

(5) Fe: 0.02 to 0.05% by Mass

Figure 6:
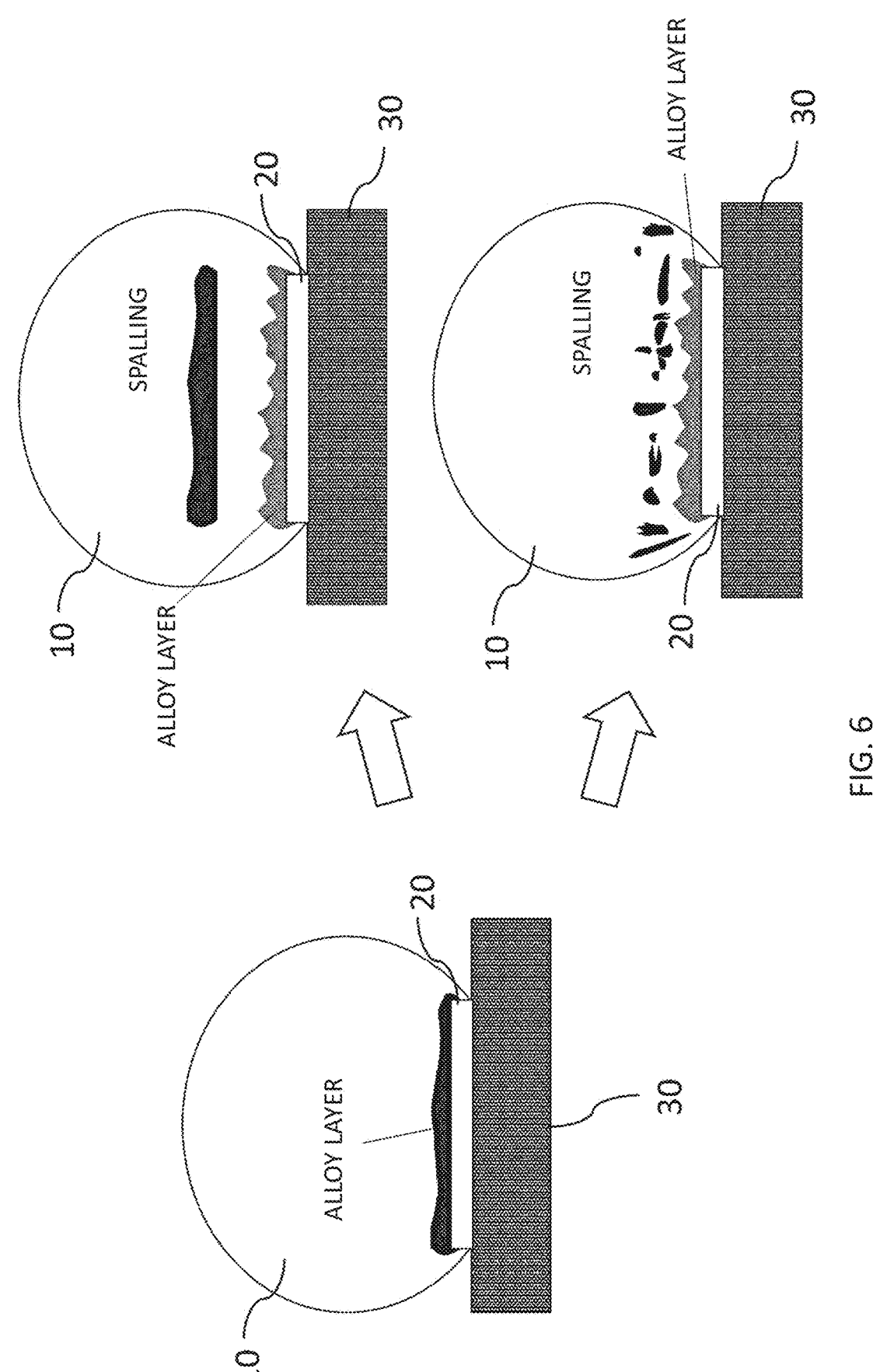
FIG. 6 is a conceptual diagram for explaining "spalling" that can occur in a solder alloy containing Ni.

Containing Fe makes Sn crystal grains finer, and improves the heat cycle characteristics. If Fe is included to be more than 0.05% by mass, the amount of the compound will be excessively increased, a coarser compound will be produced, and the problem of deteriorating the structure can be caused. On the other hand, if Fe is included to be only less than 0.02% by mass, the problem of producing an insufficient improvement effect can be caused for the heat cycle characteristics. The lower limit of the Fe content is preferably 0.023% by mass. The upper limit of the Fe content is preferably 0.040% by mass, more preferably 0.030% by mass. Further, the inventors have confirmed that the substitution with Fe instead of Ni can improve the heat cycle characteristics, and ensure mechanical reliability. "Spalling" is more likely to be generated in the case of using Ni, whereas "spalling" is less likely to be generated in the case of using Fe without using Ni. This is confirmed, as will be described later, by the fact that the CuSn-based compound ratio in the corresponding region in Example 1 was 0.0%, whereas the CuSnNi-based compound ratio in the corresponding region in Comparative Example 12 was 8.7%. Thus, "spalling" itself is controlled as described above, thereby making it possible to prevent the degradation of the acoustic quality with time, and making it possible to ensure the quality as an electric circuit. It is to be noted that FIG. 6 is a diagram illustrating an aspect in which "spalling" is generated in the case of containing Ni, which illustrates an aspect in which an alloy layer is made spalling as it is and an aspect in which an alloy layer is dispersed and made spalling. In FIG. 6, as an example, a Cu land 20 is provided on a substrate 30, and a solder alloy 10 is provided on the Cu land 20.

(6) As: 0.002 to 0.250% by Mass

In the case of employing an aspect in which the solder alloy contains As, a thickening suppression effect can be obtained. The lower limit of the As content contained is beneficially 0.002% by mass for sufficiently producing the effect of containing As. On the other hand, the upper limit of the As content is beneficially 0.250% by mass, because the wettability may be degraded if As exceeds 0.250% by mass. In addition, containing 0.002 to 0.250% by mass of As can suppress the generation of voids, and prevent the heat cycle characteristics from being degraded. Then, suppressing the generation of voids as described above can reduce factors that block the flow of electrons, and also prevent the acoustic quality from being degraded.

(7) Zr: 0.004 to 0.250%

In the case of employing an aspect in which the solder alloy contains Zr, a thickening suppression effect can be obtained. The lower limit of the Zr content contained is beneficially 0.004% by mass for sufficiently producing the effect of containing Zr. On the other hand, the upper limit of the Zr content is beneficially 0.250% by mass, because the wettability may be degraded if Zr exceeds 0.250% by mass. In addition, containing 0.004 to 0.250% by mass of Zr can suppress the generation of voids, and prevent the heat cycle characteristics from being degraded. Then, suppressing the generation of voids as described above can reduce factors that block the flow of electrons, and also prevent the acoustic quality from being degraded.

(8) Balance: Sn

The balance of the solder alloy according to the present invention is Sn. The term "solder alloy composed of . . . , and the balance Sn" in the present application may contain unavoidable impurities in addition to the elements listed in " . . . ". Moreover, even in the case of containing unavoidable impurities, the above-described effect will not be affected.

2. Solder Paste

The solder paste according to the present invention includes a flux and a solder powder.

(1) Flux Component

The flux for use in the solder paste is any of organic acids, amines, amine hydrohalides, organic halogen compounds, thixotropic agents, rosins, solvents, surfactants, polymer compounds, silane coupling agents, and colorants, or composed of a combination of two or more thereof.

Examples of the organic acids include a succinic acid, a glutaric acid, an adipic acid, a pimelic acid, a suberic acid, an azelaic acid, a sebacic acid, a dimer acid, a propionic acid, a 2,2-bishydroxymethylpropionic acid, a tartaric acid, a malic acid, a glycolic acid, a diglycolic acid, a thioglycolic acid, a dithioglycolic acid, a stearic acid, a 12-hydroxystearic acid, a palmitic acid, and an oleic acid.

Examples of the amines include an ethylamine, a triethylamine, an ethylenediamine, a triethylenetetramine, a 2-methylimidazole, a 2-undecylimidazole, a 2-heptadecylimidazole, a 1,2-dimethylimidazole, a 2-ethyl-4-methylimidazole, a 2-phenyl Imidazole, a 2-phenyl-4-methylimidazole, a 1-benzyl-2-methylimidazole, a 1-benzyl-2-phenylimidazole, a 1-cyanoethyl-2-methylimidazole, a 1-cyanoethyl-2-undecylimidazole, a 1-cyanoethyl-2-ethyl-4-methylimidazole, a 1-cyanoethyl-2-phenylimidazole, a 1-cyanoethyl-2-undecylimidazolium trimerite, a 1-cyanoethyl-2-phenylimidazolium trimerite, a 2,4-diamino-6-[2'-methylimidazolyl-(1')]-ethyl-s-triazine, a 2,4-diamino-6-[2'-undecylimidazolyl-(1')]-ethyl-s-triazine, a 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, a 2-phenyl-4,5-dihydroxymethylimidazole, a 2-phenyl-4-methyl-5-hydroxymethylimidazole, a 2,3-dihydro-1H-pyrrolo[1,2-a]benzimidazole, a 1-dodecyl-2-methyl-3-benzylimidazolium chloride, a 2-methylimidazoline, a 2-phenylimidazoline, a 2,4-diamino-6-vinyl-s-triazine, a 2,4-diamino-6-vinyl-s-triazine isocyanuric acid adduct, a 2,4-diamino-6-methacryloyloxyethyl-s-triazine, an epoxy-imidazole adduct, a 2-methylbenzoimidazole, a 2-octylbenzoimidazole, a 2-pentylbenzoimidazole, a 2-(1-ethylpentyl)benzoimidazole, a 2-nonylbenzoimidazole, a 2-(4-thiazolyl)benzoimidazole, a benzoimidazole, a 2-(2'-hydroxy-5'-methylphenyl)benzotriazole, a 2-(2'-hydroxy-3'-tert-butyl-5'-methylphenyl)-5-chlorobenzotriazole, a 2-(2'-hydroxy-3',5'-di-tert-amylphenyl)benzotriazole, a 2-(2'-hydroxy-5'-tert-octylphenyl)benzotriazole, a 2,2'-methylenebis[6-(2H-benzotriazole-2-yl)-4-tert-octylphenol], a 6-(2-benzotriazolyl)-4-tert-octyl-6'-tert-butyl-4'-methyl-2,2'-methylenebisphenol, a 1, 2, 3-benzotriazole, a 1-[N, N-bis(2-ethylhexyl)aminomethyl]benzotriazole, a carboxybenzotriazole, a 1-[N, N-bis(2-ethylhexyl)aminomethyl]methylbenzotriazole, a 2,2'-[[(methyl-1H-benzotriazole-1-yl)methyl]imino]bisethanol, a 1-(1',2'-dicarboxyethyl)benzotriazole, a 1-(2,3-dicarboxypropyl)benzotriazole, a 1-[(2-ethylhexylamino)methyl]benzotriazole, a 2,6-bis[(1H-benzotriazole-1-yl)methyl)]-4-methylphenol, a 5-methylbenzotriazole, and a 5-phenyltetrazole.

The amine hydrohalides are compounds obtained by reacting amines with hydrogen halides, and examples of the amines include an ethylamine, an ethylenediamine, a triethylamine, a diphenylguanidine, a ditolylguanidine, a methylimidazole, and a 2-ethyl-4-methylimidazole, and examples of the hydrogen halides include hydrides of chlorine, bromine, and iodine. Examples of the amine hydrohalides include amine boron trifluoride complex salts and amine tetrafluoroborates. Specific examples of the amine boron trifluoride complex salts include a piperidine boron trifluoride complex salt, and specific examples of the amine tetrafluoroborates include a cyclohexylamine tetrafluoroborate and a dicyclohexylamine tetrafluoroborate.

Examples of the organic halogen compounds include a trans-2,3-dibromo-2-butene-1,4-diol, a triallyl isocyanurate 6 bromide, a 1-bromo-2-butanol, a 1-bromo-2-propanol, a 3-bromo-1-propanol, a 3-bromo-1,2-propanediol, a 1,4-dibromo-2-butanol, a 1,3-dibromo-2-propanol, a 2,3-dibromo-1-propanol, a 2,3-dibromo-1,4-butanediol, and a 2,3-dibromo-2-butene-1,4-diol.

Examples of the thixotropic agents include wax-based thixotropic agents, amide-based thixotropic agents, and sorbitol-based thixotropic agents. Examples of the wax-based thixotropic agents include hydrogenated castor oils. Examples of the amide-based thixotropic agents include monoamide-based thixotropic agents, bisamide-based thixotropic agents, and polyamide-based thixotropic agents, and specific examples thereof include lauric acid amides, palmitic acid amides, stearic acid amides, behenic acid amides, hydroxystearic acid amides, saturated fatty acid amides, oleic acid amides, erucic acid amides, unsaturated fatty acid amides, p-toluenemethane amides, aromatic amides, methylene bisstearic acid amides, ethylene bislauric acid amides, ethylene bishydroxystearic acid amides, saturated fatty acid bis-amides, methylenebisoleic acid amides, unsaturated fatty acid bis-amides, m-xylylene bisstearic acid amides, aromatic bis-amides, saturated fatty acid polyamides, unsaturated fatty acid polyamides, aromatic polyamides, substituted amides, methylolstearic acid amides, methylolamides, and fatty acid ester amides. Examples of the sorbitol-based thixotropic agents include a dibenzylidene-D-sorbitol and a bis(4-methylbenzylidene)-D-sorbitol.

Examples of the surfactants include nonionic surfactants and weak cationic surfactants.

Examples of the nonionic surfactants include polyoxyalkylene glycols, polyoxyalkylene alkyl ethers, polyoxyalkylene esters, polyoxyalkylene acetylene glycols, polyoxyalkylene alkyl amides, for example, a polyethylene glycol and a polyethylene glycol-polypropylene glycol copolymer, aliphatic alcohol polyoxyethylene adducts, aromatic alcohol polyoxyethylene adducts, polyhydric alcohol polyoxyethylene adducts, and polyoxyalkylene glyceryl ethers.

Examples of the weak cationic surfactants include aliphatic amine polyoxyalkylene adducts, aromatic amine polyoxyalkylene adducts, terminal diamine polyalkylene glycols, for example, aliphatic amine polyoxyethylene adducts, aromatic amine polyoxyethylene adducts, polyvalent amine polyoxyethylene adduct terminal diamine polyethylene glycols, and terminal diamine polyethylene glycol-polypropylene glycol copolymers.

Examples of the rosins include raw material rosins such as a gum rosin, a wood rosin, and a tall oil rosin, and derivatives obtained from the raw material rosins. Examples of the derivatives include purified rosins, hydrogenated rosins, disproportionated rosins, polymerized rosins, and a, B unsaturated carboxylic acid modified products (acrylated rosins, maleated rosins, fumarized rosins, etc.), and purified products, hydrogenated products, and disproportionated products of the polymerized rosins, and purified products, hydrogenated products, and disproportionated products of the a, B unsaturated carboxylic acid modified products, and two or more thereof can be used. Further, at least one or more resins selected from terpene resins, modified terpene resins, terpene phenol resins, modified terpene phenol resins, styrene resins, modified styrene resins, xylene resins, and modified xylene resin can be further included in addition to the rosin-based resins. Aromatic modified terpene resins, hydrogenated terpene resins, hydrogenated aromatic modified terpene resins, and the like can be used as the modified terpene resins. Hydrogenated terpene phenol resins and the like can be used as the modified terpene phenol resins. Styrene acrylic resins, styrene maleic acid resins, and the like can be used as the modified styrene resin. Examples of the modified xylene resins include phenol-modified xylene resins, alkylphenol-modified xylene resins, phenol-modified resol-type xylene resins, polyol-modified xylene resins, and polyoxyethylene-addition xylene resins.

Examples of the solvent include water, alcohol-based solvents, glycol ether-based solvents, and terpineols. Examples of the alcohol-based solvents include an isopropyl alcohol, a 1,2-butanediol, an isobornylcyclohexanol, a 2,4-diethyl-1,5-pentanediol, a 2,2-dimethyl-1,3-propanediol, a 2,5-dimethyl-2,5-hexanediol, a 2,5-dimethyl-3-hexyne-2,5-diol, a 2,3-dimethyl-2,3-butanediol, a 1,1,1-tris(hydroxymethyl) ethane, a 2-ethyl-2-hydroxymethyl-1,3-propanediol, a 2,2'-oxybis(methylene)bis(2-ethyl-1,3-propanediol), a 2,2-bis(hydroxymethyl)-1,3-propanediol, a 1,2,6-trihydroxyhexane, a bis[2,2,2-tris(hydroxymethyl)ethyl]ether, a 1-ethynyl-1-cyclohexanol, a 1,4-cyclohexanediol, a 1,4-cyclohexanedimethanol, an erythritol, a threitol, a guayacol glycerol ether, a 3,6-dimethyl-4-octyn-3,6-diol, and a 2,4,7,9-tetramethyl-5-decyne-4,7-diol. Examples of the glycol ether-based solvents include a diethylene glycol mono-2-ethylhexyl ether, an ethylene glycol monophenyl ether, a 2-methylpentane-2,4-diol, a diethylene glycol monohexyl ether, a diethylene glycol dibutyl ether, and a triethylene glycol monobutyl ether.

(2) Flux Content

The flux content is preferably 5 to 95% by mass, more preferably 5 to 15% by mass, based on the total mass of the solder paste. Within this range, the thickening suppression effect derived from the solder powder is sufficiently produced.

(3) Solder Powder

The solder powder for use in the solder paste according to the present invention is preferably a spherical powder. The spherical powder improves the fluidity of the solder alloy.

In addition, in the case where the solder alloy is a spherical powder, soldering to fine components is enabled when the power has sizes (particle size distribution) corresponding to symbols 1 to 8 in the powder size classification (Table 2) in accordance with JIS Z 3284-1:2014. The size of the particulate solder material is more preferably the sizes corresponding to the symbols 4 to 8, more preferably the sizes corresponding to the symbols 5 to 8.

(4) Method for Producing Solder Paste

The solder paste according to the present invention is produced by a method that is common in the art. First, for the production of the solder powder, known methods can be employed, such as a dropping method of dropping a molten solder material to obtain particles, a spraying method of centrifugally spraying the material, and a method of crushing a bulk solder material. In the dropping method or the spraying method, the dropping or the spraying is preferably carried out in an inert atmosphere or a solvent for forming particles. Then, each of the above-mentioned components can be heated and mixed to prepare a flux, and the above-mentioned solder powder can be introduced into the flux, and stirred and mixed for the production.

3. Solder Ball

The solder alloy according to the present invention can be used as a solder ball. In the case of using the solder alloy as a solder ball, the solder ball can be produced from the solder alloy according to the present invention by using a dropping method that is a common method in the art. Further, a solder joint can be produced by processing the solder ball by a method that is common in the art, such as mounting and then joining one solder ball on one electrode coated with the flux. The particle size of the solder balls is preferably 1 μm or more, more preferably 10 μm or more, even more preferably 20 μm or more, particularly preferably 30 μm or more. The upper limit of the particle size of the solder ball is preferably 3000 μm or less, more preferably 1000 μm or less, even more preferably 800 μm or less, particularly preferably 600 μm or less.

4. Solder Preform

The solder alloy according to the present invention can be used as a preform. Examples of the shape of the preform include washers, rings, pellets, discs, ribbons, and wires.

5. Solder Joint

The solder alloy according to the present invention can form a solder joint by joining an electrode of a PKG (Package) such as an IC chip and an electrode of a substrate such as a PCB (printed circuit board). The solder joint according to the present invention is composed of an electrode and a solder joint part. The solder joint part mainly refers to a part formed from the solder alloy.

6. In-Vehicle Electronic Circuit, ECU Electronic Circuit, In-Vehicle Electronic Circuit Device, ECU Electronic Circuit Device The solder alloy according to the present invention is, as is clear from the foregoing description, excellent in heat cycle performance, thereby suppressing the generation and propagation of cracks in the solder alloy. For this reason, crack growth and development will not be promoted even when the solder alloy is used for automobiles in use while being constantly subjected to vibrations, that is, for in-vehicle applications. Accordingly, it is determined that the solder alloy according to the present invention is particularly suitable for soldering electronic circuits mounted in automobiles, because the solder alloy has such particularly remarkable characteristics.

As used in the present specification, "being excellent in heat cycle performance" means that even when a heat cycling test at –55° C. or lower and +150° C. or higher is performed as shown in the examples described later, the crack generation rate after 3000 cycles is less than 90%, and the residual shear strength rate after the 3000 cycles is 60% or more.

Such characteristics mean that even in use under extremely severe conditions such as the heat cycling test mentioned above, the in-vehicle electronic circuit will not undergo any breakage, that is, will not become unusable or malfunction. Furthermore, the solder alloy according to the present invention is excellent in residual shear strength rate after the lapse of the heat cycle. More specifically, even in use for a long period of time, the resistance to external forces such as shear strength will not be decreased against external forces applied externally, such as collisions and vibrations.

As described above, the solder alloy according to the present invention is more particularly used for soldering in-vehicle electronic circuits or for soldering ECU electronic circuits, thereby producing an excellent heat cycle performance.

The "electronic circuit" is a system (system) that fulfills a target function as a whole in electronical combination of multiple electronic components that each have a function.

Examples of the electronic components constituting such an electronic circuit include a chip resistance component, a multiple resistance component, a QFP, a QFN, a power transistor, a diode, and a capacitor. The electronic circuit with these electronic components built-in is provided on a substrate to constitute an electronic circuit device.

In the present invention, the substrate constituting such an electronic circuit device, for example, a printed wiring board is not particularly limited. The material thereof is also not particularly limited, but examples of the material include a heat-resistant plastic substrate (for example, FR-4 with high Tg and low CTE). The printed wiring board is preferably a printed circuit board that has a Cu land surface treated with an organic substance (OSP: organic surface protection) such as an amine or an imidazole.

7. Method for Forming Solder Alloy

The method for producing the solder alloy according to the present invention is not limited, and can be produced by melting and mixing the raw material metals.

The solder alloy according to the present invention can produce a low x-ray alloy by using a low x-ray material as a raw material therefor. Such a low x-ray alloy can makes it possible to reduce soft errors when the alloy is used for forming solder bumps around a memory.

EXAMPLES

1. Acoustic Quality

Spalling of the intermetallic compound into the bulk causes local inhomogeneity of electron flow (current density), which adversely affects the acoustic quality. The amount of the intermetallic compound produced is increased by multiple mounting (process of melting and solidifying the solder multiple times) and aging. Conventionally used Ni is known to have the effect of making the joined interface finer, but the effect promotes spalling, thus decreasing the acoustic quality.

The powders of the respective solder alloys shown in Tables 1 and 2 described later were prepared by an atomizing method. The powders of the alloys were mixed with a flux containing a pine resin, a solvent, a thixotropic agent, an organic acid, and the like ("GLV" from SENJU METAL INDUSTRY CO., LTD.) and made into pastes to prepare solder pastes. The solder pastes were each applied by paste printing with a 150 μm metal mask on a Cu land (Ni layer and Au layer laminated in this order on the Cu surface) of a six-layer printed board (FR-4, Cu-OSP), a 3216 chip resistor was then mounted with a mounter. Thereafter, the process (reflow) of melting and solidifying under the condition of a maximum temperature of 245° C. for a holding time of 40 seconds was repeated five times to prepare a test substrate.

Thereafter, the substrate was cut out, polished, and subjected to a cross-section observation. In this regard, the joined interface of a fillet part was magnified 3000 times, and observed. The total area and the CuSn-based compound area were calculated with the use of image analysis software. Scandium was used as the image analysis software. Calculated was the area ratio (%) of the CuSn-based compound=the area of the CuSn-based compound×100/the total area.

Figure 2:
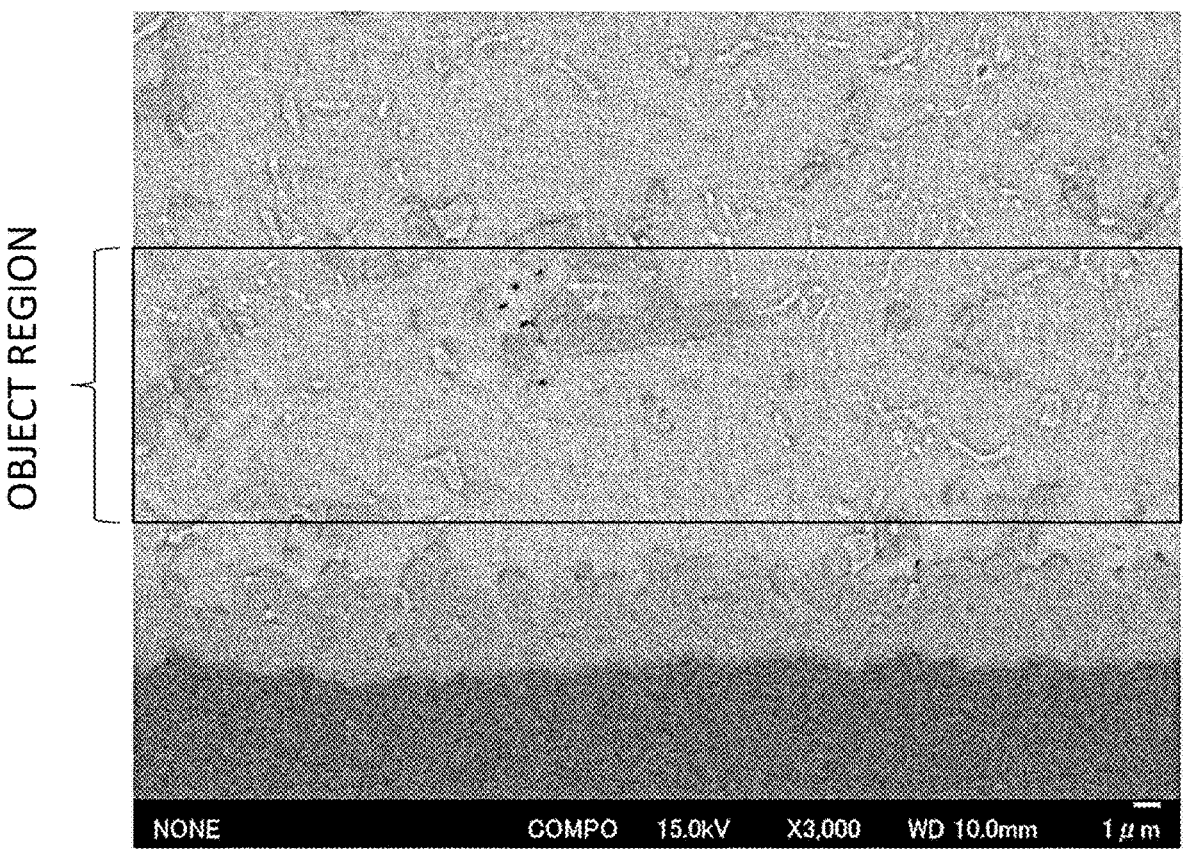
FIG. 2 is an image that shows the result of a cross-section observation in Comparative Example 12.

More specifically, five samples were prepared for each of the examples and comparative examples, and each observed in a region of 5 to 15 um from the alloy layer and the surface treatment interface (the region shown as an "object region" in FIGS. 1 and 2). The case where the average value of the area ratios of the Cusn-based compounds spalled from the joined interfaces (the average value for the five samples) was less than 1% was regarded as "O" (good), whereas the case where the average value of the area ratios of the Cusn-based compounds (the average value for the five samples) was 1% or more was regarded as "x" (defective). FIG. 1 is an image according to Example 1, where the ratio of the Cusn-based compound was 0.0% in the corresponding region. FIG. 2 is an image according to Comparative Example 12, where the ratio of the CuSnNi-based compound was 8.7% in the corresponding region.

2. Heat Cycling Test (TCT)

(1-1) Crack Reliability (Crack Rate)

Adding Ni and Co at the same time as in conventional techniques makes Sn crystal grains finer, and improves the heat cycle characteristics. The solder alloy contains no Ni according to the present embodiment, thus diminishing the foregoing effect, but diligent research by the inventors has found that the addition of Fe achieves the effect of making the Sn crystal grains finer, without contributing to the joined interface (that is, without degrading the acoustic quality).

Solder pastes were prepared by the same method as described above in "1. Acoustic quality". The solder pastes were each applied by paste printing with a 150 μm metal mask on a six-layer printed board (FR-4, Cu-OSP), and a 3216 chip resistor was then mounted with a mounter. Thereafter, reflow was performed under the condition of a maximum temperature of 245° C. for a holding time of 40 seconds, and soldering was performed to prepare a test substrate.

The test substrate soldered with each of the solder alloys was placed in a heat cycling tester set under the conditions of low temperature: −55° C., high temperature: +150° C., and holding time: 15 minutes, and after 3000 cycles, taken out from the heat cycling tester under each condition, the crack condition was observed by magnifying 3000 times, and the total length of the crack was estimated to measure the crack rate.

Crack Rate(%)=(Total Crack Length)×100/(Expected Overall Line Crack Length)

Figure 5:
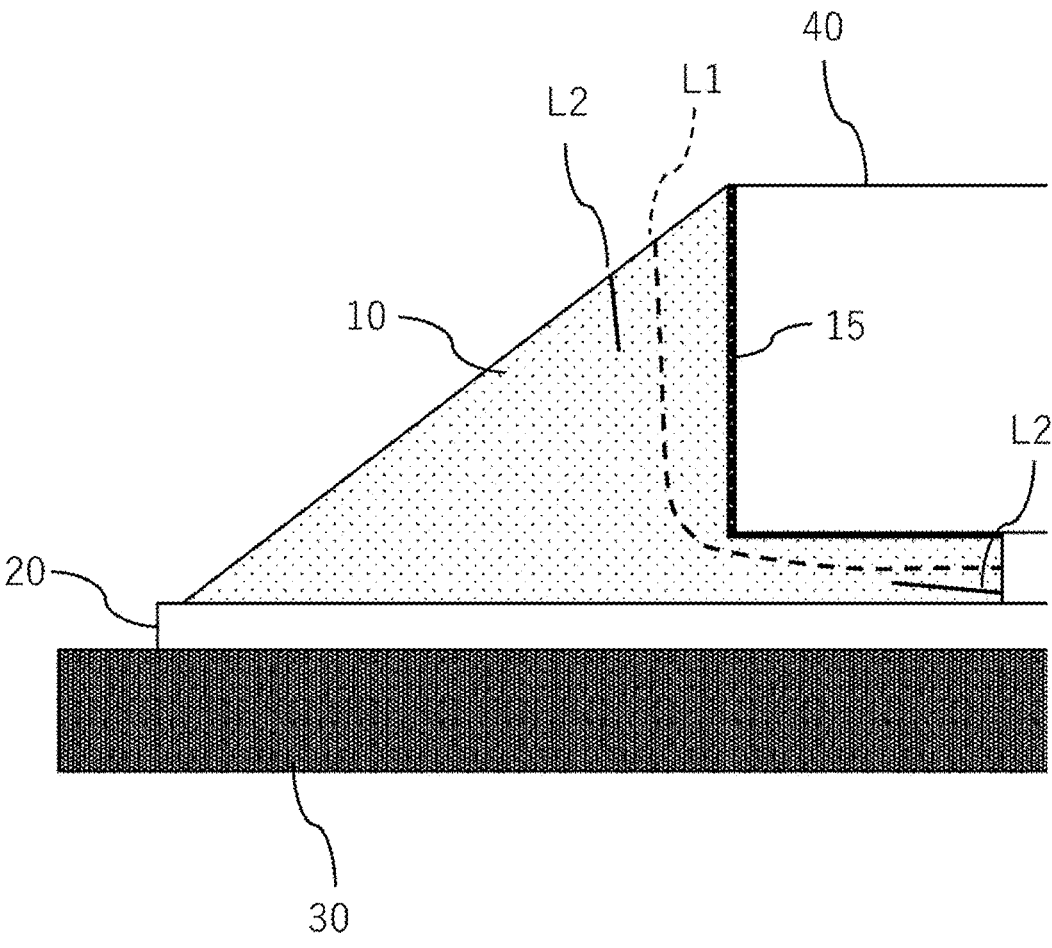
FIG. 5 is a schematic diagram illustrating a method for calculating a crack rate.

The "expected overall line crack length" herein refers to the crack length of a complete breakage. The crack rate is the rate obtained by dividing the total length of the multiple cracks L2 shown in FIG. 5 by the length of an expected crack development path L1. Five samples were prepared for each of the examples and comparative examples, and the average value of the crack rates was calculated. The case where the average value of the crack rates was less than 90% was determined as "good" with crack reliability, whereas the case where the average value of the crack rates was 90% or more was determined as "defective" without crack reliability. FIG. 5 shows an aspect in which a Cu land 20 is provided on a substrate 30 and an electronic component 40 is provided over the Cu land 20 with a solder alloy 10 interposed therebetween. In addition, reference numeral 15 in FIG. 5 denotes an intermetallic compound layer.

(1-2) Shear Strength Reliability (Residual Shear Strength Rate)

12

The shear strength reliability is an index of how much strength is maintained in the heat cycling test with respect to the shear strength of the solder joint in the initial state before the heat cycling test.

The above-mentioned respective samples after the 3000 cycles (the five samples for each of the examples and comparative examples) were subjected to a shear strength test under the conditions of test speed: 6 mm/min and test height: 50 μm at 25° C. with the use of a joint strength tester STR-5100. The residual shear strength rate (%) was determined by (shear strength after heat cycling test)×100/(initial shear strength). In the present examples, the case where the average value of the residual shear strength rate was 60% or more was regarded as "good" with shear strength reliability, whereas the case where the average value was less than 60% was regarded as not "good", because the shear strength reliability was not high.

The case where the average value of the crack rates was 90% or more and the residual shear strength rate was less than 60% is shown as "x" in Tables 1 and 2 below, and the case where the average value of the crack rates was less than 90% and the residual shear strength rate was 60% or more is shown as "◉" in Tables 1 and 2 below. The case where the average value of the crack rates was less than 90% but the residual shear strength rate was less than 60% is shown as "O" in Tables 1 and 2 below. Further, it has been successfully confirmed that the residual shear strength rate is 60% or more in the case where the sum (Fe+3×Co) of the value of the % by mass of Fe and the value of three times the % by mass of Co is 0.03 to 0.10.

3. Void

The void part of voids not only degrades the heat cycle characteristics, but also adversely affects the acoustic quality, because the flow of electrons is physically blocked. Adding a small amount of As reduces the change of the solder material with time, thereby making it possible to prevent the material from being thickened after continuous squeezing. It has been successfully confirmed that the prevention of thickening as described above leads to a void reduction.

Solder pastes were prepared by the same method as described above in "1. Acoustic quality". After the solder paste was applied by paste printing with a 150 μm metal mask on a single-sided printed board (FR-4, Cu-OSP) of 1.6 mm in thickness, a QFN with an electrode part plated with Sn of 5 mm×5 mm and the whole of 8 mm×8 mm in a plan view was mounted with a mounter. Thereafter, reflow was performed under the condition of a maximum temperature of 245° C. for a holding time of 40 seconds, and soldering was performed to prepare a test substrate.

The void ratio was measured with the use of a heating X-ray device (TUX-3200).

Void Ratio(%)=(Void Area)×100/(Total Area)(5 mm×5 mm in the present examples)

Figure 3:
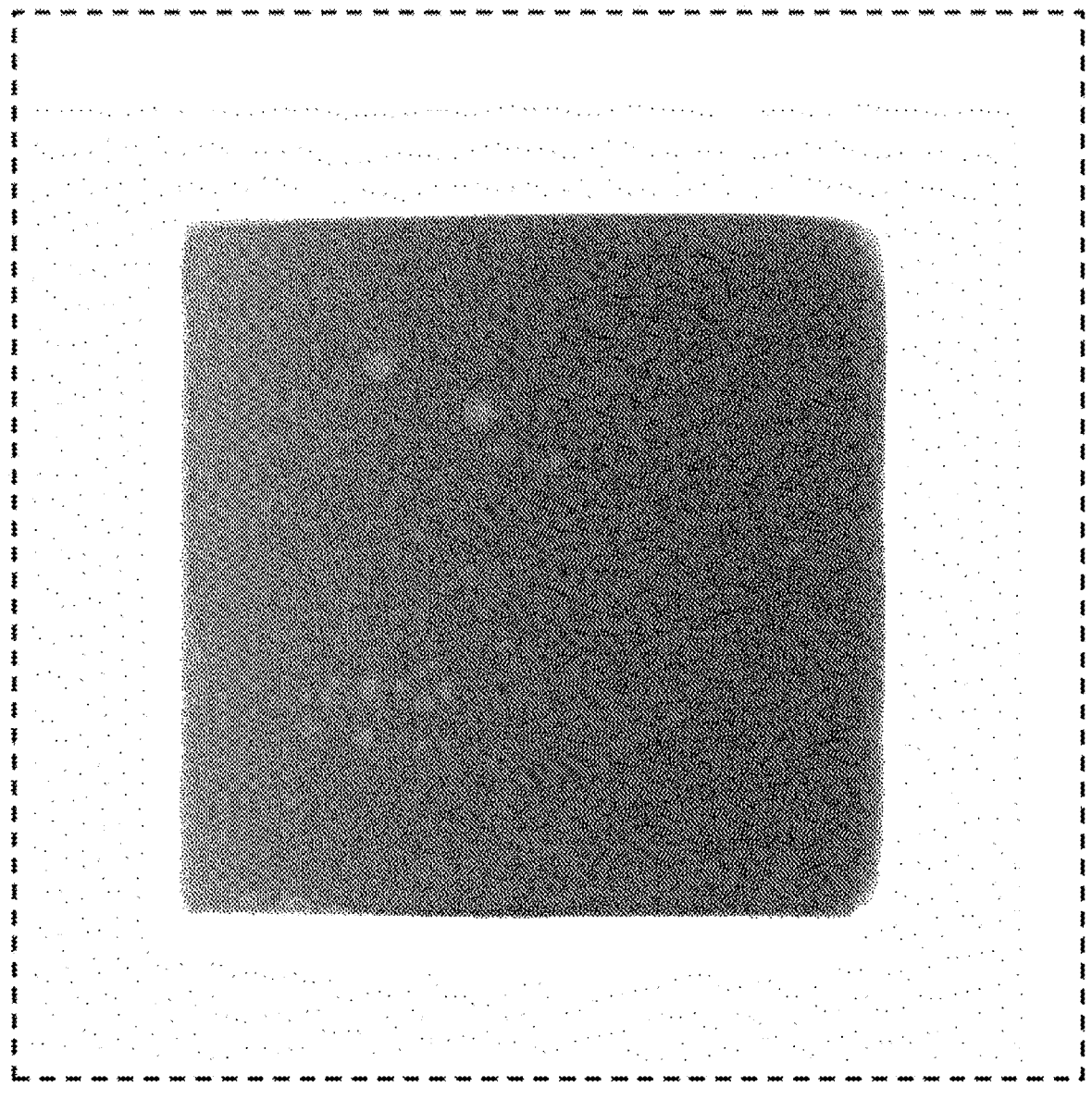
FIG. 3 is an image that shows the result of an observation through a heating X-ray device in Example 14.
Figure 4:
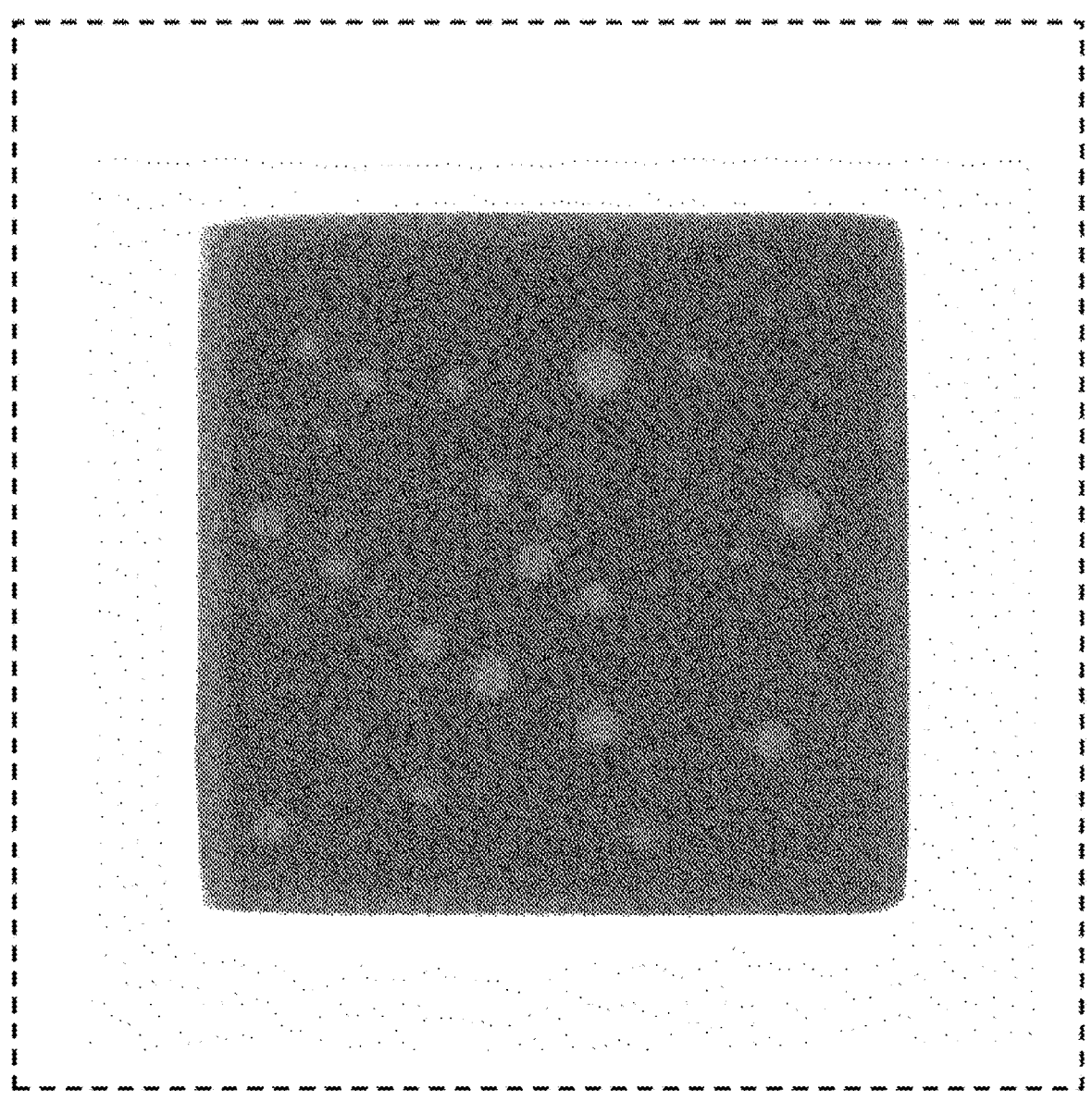
FIG. 4 is an image that shows the result of an observation through a heating X-ray device in Example 1.

Five samples were prepared for each of Examples 1 and 14, and the average value of the void ratios was calculated. The case where the average value of the void ratios was 5% or less was determined as being low in void ratio, and is shown by "◉" in Table 1. The case where the average value of the void ratios exceeded 5% was determined as not being low in void ratio, and is shown by "O" in Table 1. FIG. 3 is an image according to Example 14, with a low void ratio. FIG. 4 is an image according to Example 1, with a higher void ratio as compared with Example 14. It is to be noted that the dotted lines in FIGS. 3 and 4 show the outer shapes of the QFNs of 8 mm×8 mm, and the images shown in black correspond to the electrode parts of 5 mm×5 mm.

As shown in Table 1 below, it has been successfully confirmed that the solder alloys that meet the requirements of Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, and the balance of Sn, or Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, As: 0.002 to 0.250% by mass, and the balance of Sn are regarded as "○" in terms of acoustic quality and regarded as "◎" or "○" in the result of the heat cycling test (TCT).

(Fe+3×Co) of the value of the % by mass of Fe and the value of three times the % by mass of Co (shown as "Formula" in Tables 1 and 2) is 0.03 to 0.1.

As shown in Table 2 below, it has been successfully confirmed that in the case of the solder alloys that fail to meet the requirements of Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, and the balance of Sn, and Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to

TABLE 1

| | Solder Composition (% by mass) | | | | | | | | Structure | | | |
| | Sn | Ag | Cu | Bi | Sb | Co | Fe | As | Ni | Formula | (acoustic) | TCT | Void |
|---|---|---|---|---|---|---|---|---|---|---|---|---|---|
| Example 1 | balance | 3.4 | 0.7 | 3.2 | 3 | 0.008 | 0.025 | — | — | 0.049 | ○ | ◎ | ○ |
| Example 2 | balance | 3.1 | 0.7 | 3.9 | 3.2 | 0.006 | 0.028 | — | — | 0.046 | ○ | ◎ | — |
| Example 3 | balance | 4.0 | 0.8 | 2.9 | 3 | 0.01 | 0.03 | — | — | 0.060 | ○ | ◎ | — |
| Example 4 | balance | 3.5 | 0.6 | 4.2 | 5 | 0.008 | 0.025 | — | — | 0.049 | ○ | ◎ | — |
| Example 5 | balance | 3.4 | 0.8 | 3 | 3.6 | 0.01 | 0.024 | — | — | 0.054 | ○ | ◎ | — |
| Example 6 | balance | 3.3 | 0.7 | 1.5 | 4.2 | 0.01 | 0.026 | — | — | 0.056 | ○ | ◎ | — |
| Example 7 | balance | 3.3 | 0.7 | 5.5 | 2.8 | 0.006 | 0.026 | — | — | 0.044 | ○ | ◎ | — |
| Example 8 | balance | 3.5 | 0.7 | 4.8 | 1.0 | 0.008 | 0.025 | — | — | 0.049 | ○ | ◎ | — |
| Example 9 | balance | 3.5 | 0.7 | 2.8 | 6.0 | 0.01 | 0.028 | — | — | 0.058 | ○ | ◎ | — |
| Example 10 | balance | 3.4 | 0.6 | 2.8 | 3 | 0.001 | 0.025 | — | — | 0.028 | ○ | ○ | — |
| Example 11 | balance | 3.3 | 0.7 | 3.4 | 2.8 | 0.03 | 0.027 | — | — | 0.117 | ○ | ○ | — |
| Example 12 | balance | 3.4 | 0.7 | 4 | 3.2 | 0.01 | 0.02 | — | — | 0.050 | ○ | ◎ | — |
| Example 13 | balance | 3.3 | 0.8 | 3.6 | 3.2 | 0.01 | 0.05 | — | — | 0.080 | ○ | ◎ | — |
| Example 14 | balance | 3.5 | 0.7 | 3.8 | 2.8 | 0.008 | 0.026 | 0.004 | — | 0.050 | ○ | ◎ | ◎ |
| Example 15 | balance | 3.5 | 0.7 | 3.4 | 2.8 | 0.002 | 0.02 | — | — | 0.026 | ○ | ○ | — |

In addition, it has been successfully confirmed that the result of the heat cycling test (TCT) is regarded as "◎", which is even better, in the aspect in which the sum 0.05% by mass, As: 0.002 to 0.25% by mass, and the balance of Sn, the acoustic quality is regarded as "x", or the result of the heat cycling test (TCT) is regarded as "x".

TABLE 2

| | Solder Composition (% by mass) | | | | | | | | | Structure | | |
| | Sn | Ag | Cu | Bi | Sb | Co | Fe | As | Ni | Formula | (acoustic) | TCT |
|---|---|---|---|---|---|---|---|---|---|---|---|---|
| Comparative Example 1 | balance | 3.0 | 0.7 | 3.2 | 3 | 0.008 | 0.024 | — | — | 0.048 | X | — |
| Comparative Example 2 | balance | 3.4 | 0.5 | 5 | 1 | 0.008 | 0.025 | — | — | 0.049 | X | — |
| Comparative Example 3 | balance | 3.4 | 0.7 | 1.0 | 3 | 0.008 | 0.026 | — | — | 0.050 | ○ | X |
| Comparative Example 4 | balance | 3.5 | 0.7 | 6.0 | 5 | 0.01 | 0.024 | — | — | 0.054 | ○ | X |
| Comparative Example 5 | balance | 3.4 | 0.6 | 2 | 0.5 | 0.008 | 0.024 | — | — | 0.048 | ○ | X |
| Comparative Example 6 | balance | 3.3 | 0.7 | 2 | 7.0 | 0.01 | 0.026 | — | — | 0.056 | X | — |
| Comparative Example 7 | balance | 3.4 | 0.8 | 2 | 2 | 0.0 | 0.025 | — | — | 0.025 | ○ | X |
| Comparative Example 8 | balance | 3.6 | 0.7 | 3.2 | 3 | 0.2 | 0.026 | — | — | 0.626 | X | — |
| Comparative Example 9 | balance | 3.4 | 0.7 | 2 | 2 | 0.008 | 0.0 | — | — | 0.024 | ○ | X |
| Comparative Example 10 | balance | 3.3 | 0.8 | 3.2 | 3 | 0.01 | 0.2 | — | — | 0.230 | X | — |
| Comparative Example 11 | balance | 3.4 | 0.7 | 5 | 6 | 0.02 | 0.025 | — | 0.01 | 0.085 | X | — |
| Comparative Example 12 | balance | 3 | 0.7 | 3.2 | 3 | 0.008 | 0.1 | — | 0.03 | 0.124 | X | — |
| Comparative Example 13 | balance | 3.8 | 0.7 | 3 | 1.4 | — | — | — | 0.03 | — | X | — |

More specifically, it has been successfully confirmed that in the case where Ag is less than 3.1% by mass, Cu is less than 0.6% by mass, Sb exceeds 6% by mass, Co exceeds 0.03% by mass, or Fe exceeds 0.05% by mass, the acoustic quality is regarded as "x" (Comparative Examples 1, 2, 6, 8, and 10). In addition, it has been successfully confirmed that in the case of containing "Ni", the acoustic quality is regarded as "x", which is defective, in all of the aspects (Comparative Examples 11 to 13).

In addition, it has been successfully confirmed that in the case where Bi is less than 1.5% by mass, Bi exceeds 5.5% by mass, Sb is less than 1.0% by mass, Co is less than 0.001% by mass, or Fe is less than 0.02% by mass, the result of the heat cycling test (TCT) is regarded as "x", which is defective (Comparative Examples 3 to 5, 7, and 9).

REFERENCE SIGNS LIST 10 solder alloy
15 intermetallic compound layer
20 Cu land
30 substrate
40 electronic component
L1 expected crack development path
L2 crack development path

The invention claimed is:

1. A solder alloy consisting of Ag: 3.1 to 4.0% by mass, Cu: 0.6 to 0.8% by mass, Bi: 1.5 to 5.5% by mass, Sb: 1.0 to 6.0% by mass, Co: 0.001 to 0.030% by mass, Fe: 0.02 to 0.05% by mass, As: 0.002 to 0.250% by mass, and a balance Sn, wherein the solder alloy exhibits at least the following characteristics:

in a test substrate prepared by joining a Cu land to a chip resistor by reflow melting a solder paste comprising the solder alloy, an average value of the area ratios of the CuSn-based compounds spalled from a joined interface between the solder paste and the Cu land is less than 1%, and when the test substrate is subject to 3000 heat cycles of −55° C. to 150° C. and a holding time of 15 minutes, an average value of crack rates based on expected overall line crack length is less than 90%.

2. The solder alloy according to claim 1, wherein a sum of a value of the % by mass of Fe and a value of three times the % by mass of Co is 0.03 to 0.10.

3. A solder paste having a solder powder being the solder alloy according to claim 1, and a flux.

4. A solder ball being the solder alloy according to claim 1.

5. A solder preform being the solder alloy according to claim 1.

6. A solder joint having the solder alloy according to claim 1.

7. An in-vehicle electronic circuit having the solder alloy according to claim 1.

8. An ECU electronic circuit having the solder alloy according to claim 1.

9. An in-vehicle electronic circuit device including the in-vehicle electronic circuit according to claim 7.

10. An ECU electronic circuit device including the ECU electronic circuit according to claim 8.

* * * * *